Figure 1:

S. A. BRACKETT.
Attaching Knobs to Drawers, &c.

No. 144,597. Patented Nov. 18, 1873.

Witnesses.
Geo. W. Carnes.
William Standish.

Inventor.
Saml. A. Brackett by his attys.
Hodges & Barrett

AM. PHOTO-LITHOGRAPHIC CO. N.Y. (OSBORNE'S PROCESS)

UNITED STATES PATENT OFFICE.

SAMUEL A. BRACKETT, OF BOSTON, MASSACHUSETTS.

IMPROVEMENT IN ATTACHING KNOBS TO DRAWERS, &c.

Specification forming part of Letters Patent No. 144,597, dated November 18, 1873; application filed October 9, 1873.

*To all whom it may concern:*

Be it known that I, SAMUEL A. BRACKETT, of the city of Boston, in the State of Massachusetts, have invented an Improved Screw, of which the following is a specification:

The object of my invention is to provide a screw, by means of which, when driven from the inside of the drawer in the usual manner, knobs can be attached to bureaus and similar articles in such a way that they will not be liable to become unscrewed from accidents in use. The improvement can be adapted to ordinary screws, but preferably the screw is made originally in the improved form to be described. The improvement consists in cutting off the thread upon, or otherwise suitably flattening, two opposite sides of the screw from its point for about one-half its length, and parallel to the slot in the head, so that, after the screw is driven in, the position of the faces of the flattened sides may be indicated by the direction of the slot.

In applying this screw to common knobs, a small hole is bored in the neck of the knob, intersecting and passing the central hole in the knob about one-half its diameter on one side of the center. With the knob thus prepared, when the screw has been driven not quite home into the central hole, it is so adjusted by means of the driver that the slot in the head of the screw and the hole in the neck of the knob shall be in the same line, as near as may be. This adjustment effected, which can always be done by a slight further turn of the screw—never exceeding a quarter of a revolution, either forward or back, as may be best—a small screw is driven into the hole in the neck of the knob, and will pass across the face of one of the flattened sides of the principal screw, and prevent the knob from being unscrewed. In place of the small screw a simple pin may be used; but the former is preferable, since it can be withdrawn at pleasure, and the hole for it need only just pass the central hole.

It is obvious that the hole in the neck of the knob may be formed perpendicularly to the central hole, and, being properly adjusted with reference to the flattened sides of the screw, the fastening screw or pin, having its end suitably blunted, may be driven in directly upon one of the flattened sides, and, in a measure, serve to prevent the knob from unscrewing. So, too, the faces of the flattened sides of the screw may be at right angles with each other; or the screw may be formed with one or more than two flattened sides; and the flattened sides may be formed elsewhere upon the screw than its end, or with some other relation to the slot in the head, or with relation to some other indicator formed upon the head, than hereinbefore described; but such are only inferior variations of my invention, if of any value, or practicable at all.

Figure 2:
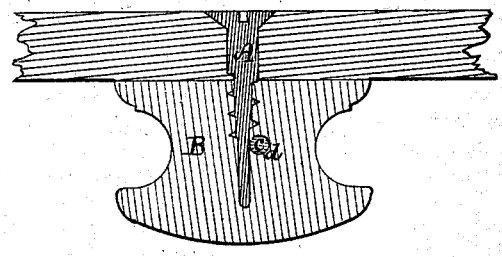

Figure 1 is a perspective view of my improved screw. Fig. 2 is a sectional view, showing the application of my invention to knobs, in which A is the principal screw; B, the knob; c, the small fastening-screw; and d, the hole in the neck of the knob, into which it is driven.

I claim as my invention—

The combination of the flattened screw A with the knob B, and screw c or its equivalent, arranged substantially as and for the purposes hereinbefore set forth.

SAMUEL A. BRACKETT.

Witnesses:
 ION F. BARRETT,
 WILLIAM STANDISH.